(12) United States Patent
Maladen

(10) Patent No.: US 8,675,919 B2
(45) Date of Patent: Mar. 18, 2014

(54) METHOD FOR QUANTIFYING THE NUMBER OF FREE FIBERS EMANATING FROM A SURFACE

(75) Inventor: Ryan Dominic Maladen, Anderson Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 156 days.

(21) Appl. No.: 13/410,678

(22) Filed: Mar. 2, 2012

(65) Prior Publication Data

US 2013/0230207 A1 Sep. 5, 2013

(51) Int. Cl.
*G06K 9/00* (2006.01)
(52) U.S. Cl.
USPC .......................................................... 382/103
(58) Field of Classification Search
USPC ................ 345/422, 589; 356/242.1; 382/103
See application file for complete search history.

(56) References Cited

U.S. PATENT DOCUMENTS

| | | | |
|---|---|---|---|
| 5,569,234 | A | 10/1996 | Buell et al. |
| 5,643,588 | A | 7/1997 | Roe et al. |
| 5,674,216 | A | 10/1997 | Buell et al. |
| 5,702,551 | A | 12/1997 | Huber et al. |
| 5,897,545 | A | 4/1999 | Kline et al. |
| 6,120,489 | A | 9/2000 | Johnson et al. |
| 6,585,855 | B2 | 7/2003 | Drew et al. |
| 2010/0089264 | A1 | 4/2010 | Warner |
| 2010/0300309 | A1 | 12/2010 | Schneider |

OTHER PUBLICATIONS

Xu, L., et al., APF Journal, "Technique for Determining the Fibre Distribution in the Z-Direction Using Confocal Microscopy and Image Analysis," vol. 50, pp. 325-326 (1997).*
Xu, Weilin, et al., Paper Chemicals, "Snippet Counting for Cotton Length Distribution Measurement Using Image Analysis," vol. 78, Issue 4, pp. 336-341 (2008).*
He, Jihong, et al., *Paper Chemicals*, "A Microscopic Study of Fibre-Fibre Contacts in Paper," pp. 323-330 (2003).
Knotzer, U., et al., *Paper Chemicals*,"Paper Structure in Z-Direction," vol. 131, Issue 11-12, pp. 688-699 (2003).
Svensson, S., et al., *Paper Chemicals*, "Using Distance Transform Based Algorithms for Extracting Measures of the Fiber Network in Volume Images of Paper," vol. 33, Issue 4(b) pp. 562-571 (2003).
Annis, P.A., et al., *Paper Chemicals*, "Fuzzing and Pilling From Fabric-on-Fabric Nonaccelerated Abrasion," vol. 1, Issue 9, pp. 71-75 (2001).
Thorpe, J., et al., *Paper Chemicals*, Determination of Fiber Orientation in Z-Directional Layers of Paper with the Hough Transform, pp. 65-79 (1999).
Him, U., et al., 2007 International Paper Physics Conference, "Evaluating an Improved Method to Determine Layered Fibre Orientation by Sheet Splitting" (2007).
Ucar, N., et al., *INSPEC*, "Prediction of Fuzz Fibers on Fabric Surface by Using Neural Network and Regression Analysis," vol. 15, Issue 2, pp. 58-61 ([London] Institution of Electrical Engineers (2007).
Anonymous, *Research Disclosure*, "Tow Crimp Analyzer," vol. 209, p. 617 (Industrial Opportunities, Ltd., 1960).
Bilisik, K., et al., *Textile Research Journal*, "Abrasian Properties of Upholstery Flocked Fabrics," vol. 79, Issue 17, pp. 1625-1632 (2009).

(Continued)

*Primary Examiner* — Gregory F Cunningham
(74) *Attorney, Agent, or Firm* — Peter D. Meyer

(57) ABSTRACT

The present disclosure provides a method for counting the number of fibers emanating from the surface of a web substrate.

19 Claims, 5 Drawing Sheets

(56) References Cited

OTHER PUBLICATIONS

Raina, M.A., et al., *Technische Textilien*, "Fleece Materials Analysis by Means of Digital Image Processing," vol. 51, pp. 186-187 (Internat. Business Press Publ., 2008).
Serdaroglu, A., et al., *Pattern Recognition and Image Analysis*, "Defect Detection in Textile Fabric Images Using Subband Domain Subspace Analysis," vol. 17, pp. 663-674, Issue 4 (SP MAIK Nauka/Interperiodicals [Dordrecht], 2007).
Klein, R., et al., *International Paper World*, "Metrology Related Evaluation of Graphic Paper and Board Cross Sections by Digital Image Analysis," vol. 4, pp. 48-58 (2006).
Bilisik, K., et al., Proceedings of the Pulp and Paper Research Conference, "Techniques for Analyzing Paper Properties by Applying Image Processing to Light Transmission Image," pp. 164-169 (2001).
Enomae, T., et al., *Journal of Wood Science*, "Z-Directional Distribution of Fiber Orientation of Japanese and Western Papers Determined by Confocal Laser Scanning Microscopy," vol. 54, Issue 4, pp. 300-307 (2008).
Szikla, Z., et al., *Journal of Pulp and Paper Science*, "Changes in Z-Direction Density Distribution of Paper in Wet Pressing," vol. 15, Issue 1, pp. 11-17 (1989).
Annis, P., *Paper Chemicals*, "Surface Wear Analysis of Fabrics," vol. 33, Issue 9, pp. 30-33 (2005).
Palmer, S., *Textile Research Journal*, "Objective Classification of Fabric Pilling Based on the Two-Dimensional Discrete Wavelet Transform," vol. 73, Issue 8, pp. 713-720 (2003).
Ivanov, I., et al., *Mechanics of Advanced Materials Model with Fiber Orientation*, "Flexible Woven Fabric Micromechanical Material Model with Fiber Reorientation," vol. 9, Issue 1, pp. 37-51 (2002).
Semnani, D., et al., *Fibers and Textile in Eastern Europe*, "Surface Roughness Measurement of Weft Knitted Fabrics Using Image Processing," vol. 19, Issue 3(86), pp. 55-59 (2011).
Anonymous, *Research Disclosure*, "Crimp Measuring Apparatus and Process," vol. 316, p. 617 (Industrial Opportunities, Ltd., 1960).
Yang, H., et al. (Thesis/Dissertation) "A Geometric and Statistical Analysis of Fibrous Materials From Three-Dimensional High Resolution Images" (2001).
Hsi, C., et al. (Thesis/Dissertation) "Image Analysis of Fabric Pills and Fuzz" (1998).
Gunsel, B., Proceedings of the IEEE 12th Signal Processing and Communications Applications Conference, "Automated Inspection of Textile Defects Using Independent Component Analysis," pp. 743-746 (2004).
Kim, et al., International Nonwovens Journal, "Characterizing Fuzz in Nonwoven Fabrics," Spring 2000.
15th International Flock Symposium, "Online Quality Control of the Pile of Flocked Textile Material by Image Analysis and Fuzzy Classificators," pp. 12-1/12 (2000).
Jose, D. (Thesis/Dissertation); "New Instrumental Techniques to Quantify Textural Change in Carpet" (1984).
Ramanathan, R. (Thesis/Dissertation) "Orientation Measurements in Fibrous Assemblies Using Image Analysis" (1994).
Xu, B. (Thesis/Dissertation) "Assessment of Carpet Appearance by Image Analysis" (1992).
Wu, Y. (Thesis/Dissertation) "Advanced Image Analysis Techniques for Quantifying Carpet Appearance" (1990).
Hafren, et al., *Journal of Wood Science*, "Fluorescence Lifetime Imaging Microscopy Study of Wood Fibers," vol. 55, pp. 236-239 (2009).
Jackson, "A Preliminary Report: Fuzz and Pilling Surface Changes on Cotton Fabrics Measured by Linetech Industries' Image Analysis System," 2005 Beltwide Cotton Conferences, New Orleans, Louisiana, Jan. 4-7, 2005.

* cited by examiner

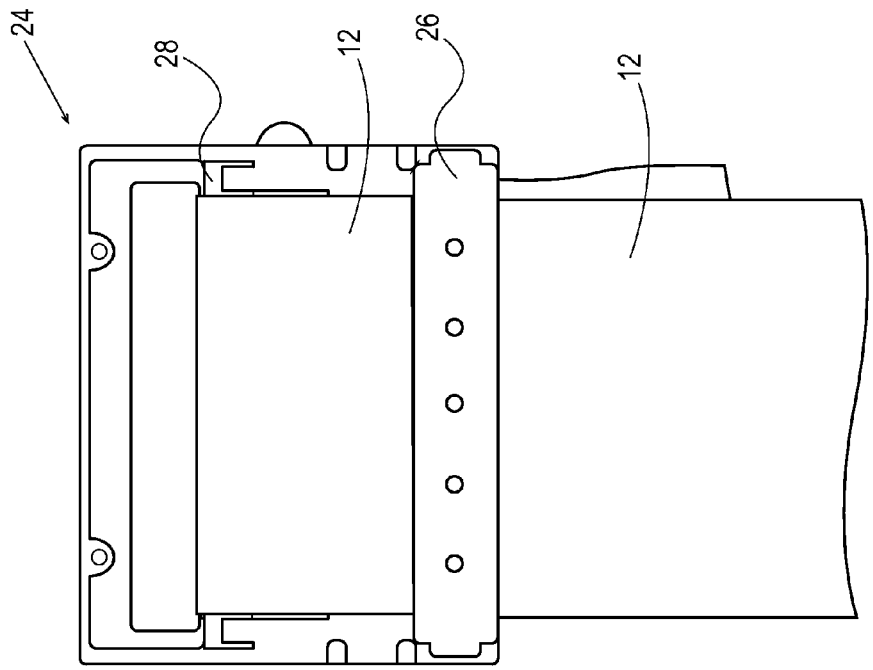
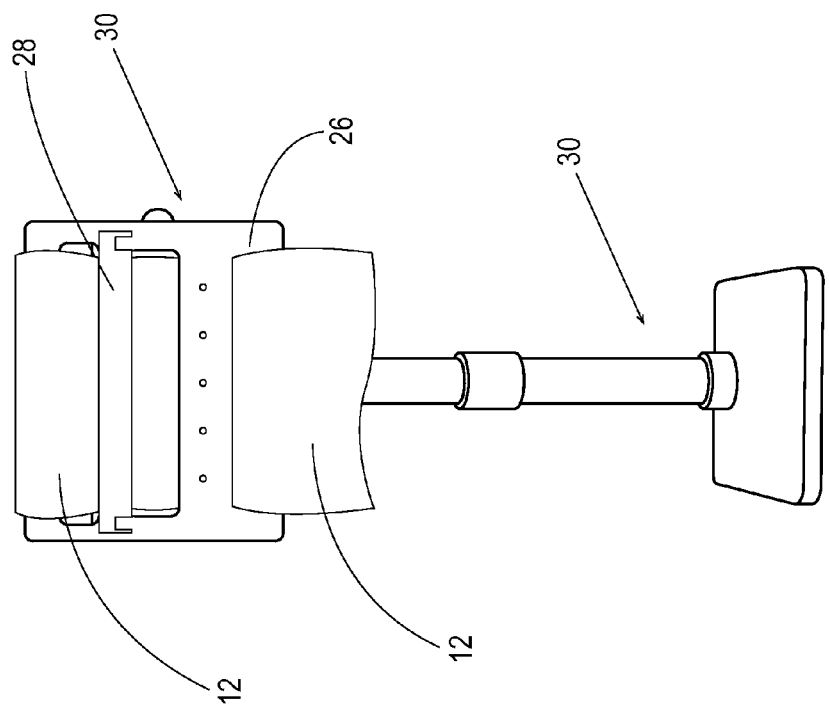

METHOD FOR QUANTIFYING THE NUMBER OF FREE FIBERS EMANATING FROM A SURFACE

FIELD OF THE INVENTION

This disclosure relates generally to an image analysis method for quantifying the number of fibers that emanate from the surface of a web substrate. This disclosure more generally relates to determining the number of fibers that a distal end of a portion of a fiber that is unattached to an underlying support structure such as facial, bath, and paper toweling.

BACKGROUND OF THE INVENTION

Market research has shown that "softness" is a property of paper-based consumer products, such as facial tissue, bath tissue, paper toweling, paper napkins, and the like, as well as other non-paper-based consumer products. It has been found that softness is important to consumers in selecting and determining the quality and desirability of such products. Therefore, it is advantageous to be able to demonstrate the softness of such a consumer product to the consumer, as a way of making the product more desirable.

One method for quantifying softness has been to determine metrics that describe fibers that emanate from the surface of a web substrate. While the configuration of fibers emanating from the surface of a web substrate may exist in many forms (e.g., fiber 'loops' where both ends of a fiber are attached to the surface and the middle of the fiber is not, 'free fibers' where one end of the fiber is attached to the surface and the distal end is not, or other configurations of 'free fibers' where the central portion of the fiber is attached to the surface and both ends are not attached, etc.) it can be advantageous to understand the metrics of the so-called 'free fibers.' This understanding of 'free fibers' is generally directed to those fibers attached to the underlying web substrate at one end while the distal end or part of the fiber is removed from the surface or fibers where a central portion of such fibers are attached to the surface and one or both ends are not. These metrics are sometimes known to those of skill in the art as the 'free fiber end' number or the 'fuzz-on-edge' value.

One method for determining the free fiber end number involves the manual (i.e., optical) counting of the number of free fibers whose one end is visible and unattached to a substrate surface. While this subjective method may be sufficient in certain circumstances, the overall free fiber end number can be affected by the person doing the counting (e.g., random error, fatigue, etc.) as well as the need for value judgments based upon what is believed to be contained within the image. Additionally, experience has shown that it can take between sixty and ninety minutes to perform a single analysis using this manual method. While the method itself may produce reasonable data, it can be difficult to perform adequate quality assurance to verify the data generated.

Another method used to quantify free fibers involves estimating the ratio between the length of the profile that outlines the free fibers and the width of the samples tested to provide an average fuzz-on-edge value or amount of free fibers. Such a method is described in U.S. Pat. No. 6,585,855 B2.

A significant draw-back of the above-mentioned analyses are that these processes can only provide one metric for the free fibers on a sample. These methods are difficult to adjust in order to provide other sample-related metrics. In other words, different tests have to be completed using different testing techniques and possibly apparatii in order to provide a more complete picture of the metrics associated with a particular sample or product.

Additionally, having a more dynamic method of demonstrating the softness of a consumer product, using easily understood methods and familiar test materials, is clearly desirable. Compressibility and free fibers both contribute to product softness but are very different properties of the substrate. However a significant drawback of using the compressibility measure to express softness is that the results of scientific compressibility testing, while perhaps easily understood by one who is literate in the art of materials testing or in mathematics, may not be understood by the average consumer in relation to the subjective perception of softness. An ideal method for demonstrating softness would use the consumer product in a manner easily understood and related to by consumers. Such a method could be filmed or photographed and then used in advertisements, or it could be carried out in the direct presence of consumers, as a live demonstration in a store or other public location.

SUMMARY OF THE INVENTION

An exemplary embodiment of the present disclosure provides a method for counting the number of fibers emanating from the surface of a web substrate. The web substrate has a machine direction, a cross-machine direction orthogonal and coplanar thereto, and a Z-direction orthogonal to both the machine and cross-machine directions. The method comprising the steps of: a) providing an image file of the web substrate, the image file containing at least a two-dimensional image of the web substrate wherein at least one of the at least two-dimensions comprises at least a component of the Z-direction; b) establishing a Z-direction baseline with respect to the image file having a length, L, and being generally coplanar to the Z-direction and having a component orthogonal to the Z-direction; c) determining a pixel intensity of a first pixel disposed above the Z-direction baseline a height, d, and along the length L; d) determining a pixel intensity of a second pixel disposed the height, d, disposed adjacent the first pixel, the second pixel being disposed the height, d, above the Z-direction baseline and generally orthogonal to the Z-direction; e) determining a change of intensity between the first pixel and the second pixel; f) determining a number of changes in the change of intensity from step e); and, g) correlating the number of positive changes from the step f) to the number of fibers emanating from the surface of the web substrate.

BRIEF DESCRIPTION OF THE DRAWINGS

FIG. 5 is a photomicrograph of a perspective view of an exemplary stand with an exemplary holder having an exemplary tissue product contained therein in accordance with the current invention in the process of being prepared for imaging;

FIG. 6 is a photomicrograph of a perspective view of an exemplary holder having an exemplary tissue product contained therein in accordance with the current invention;

DETAILED DESCRIPTION OF THE INVENTION

Figure 1:
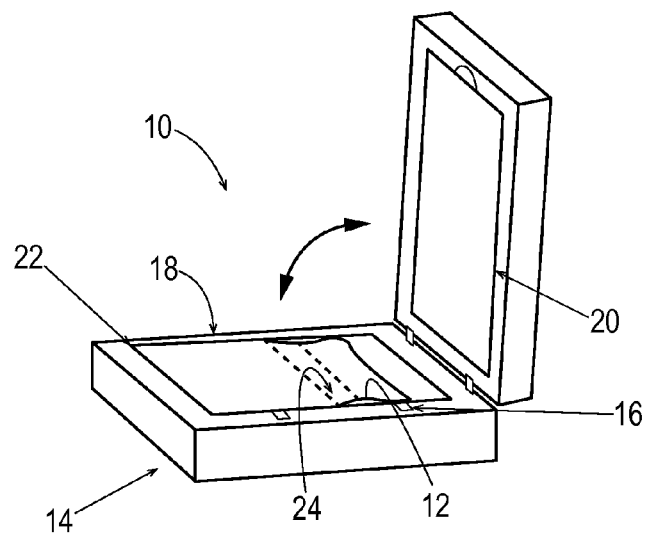
FIG. 1 is an exemplary rendering of an apparatus suitable for generating an image file suitable for use with the current invention.

As used herein, "image file formats" (or "image files") are standardized means of organizing and storing digital images. Image files are composed of either pixels, vector (geometric) data, or a combination of the two. Whatever the format, the files are rasterized to pixels when displayed on most graphic displays. The pixels that constitute an image are ordered as a grid (columns and rows); each pixel consists of numbers representing magnitudes of intensity and color.

Image file size—expressed as the number of bytes—increases with the number of pixels composing an image, and the color depth of the pixels. The greater the number of rows and columns, the greater the image resolution for a fixed field of view and the larger the image file. Image files can be provided as grey-scale image files, be oriented as may be required by the end user, and be readily converted to other file formats by processing.

High resolution cameras and scanners can produce large image files, ranging from hundreds of kilobytes to gigabytes, per the camera's resolution and the image-storage format capacity. For example, an image recorded by a 12 megapixel camera; since each pixel uses 3 bytes to record true color, the uncompressed image would occupy 36,000,000 bytes of memory—a great amount of digital storage for one image, given that cameras must record and store many images to be practical. Faced with large file sizes, both within the camera and a storage disc, image file formats were developed to store such large images. An overview of the major graphic file formats some of which use compression to reduce file size follows below.

Including proprietary types, there are hundreds of image file types. The PNG, JPEG, TIFF, and GIF formats are most often used to display images. These graphic formats can be separated into two main families of graphics: raster and vector.

In addition to straight image formats, metafile formats are portable intermediate formats which can include both raster and vector information. Examples are application-independent formats such as WMF and EMF. Several known applications open metafiles and then save them in their own native format. Another format, the page description language (PDL) describes the layout of a printed page containing text, objects and images in textual or binary data streams. Examples include PostScript, PDF and PCL.

As used herein, a "gray scale" or "grey scale" digital image is an image in which the value of each pixel is a single sample, that is, it carries only intensity information These images are composed exclusively of shades of gray, varying from black at the weakest intensity to white at the strongest. Gray scale images are distinct from one-bit bi-tonal black-and-white images, which in the context of computer imaging are images with only the two colors, black, and white (also called bi-level or binary images). Gray scale images are often the result of measuring the intensity of light at each pixel in a single band of the electromagnetic spectrum (e.g. infrared, visible light, ultraviolet, etc.), and in such cases they are monochromatic proper when only a given frequency is captured. But also they can be synthesized from a full color image; see the section about converting to gray scale.

For gray scale images the intensity of a pixel is expressed within a given range between a minimum and a maximum, inclusive. This range is represented in an abstract way as a range from 0 (total absence, black) and 1 (total presence, white), with any fractional values in between. This notation is used in academic papers, but it must be noted that this does not define what "black" or "white" is in terms of colorimetry. Another convention is to employ percentages, so the scale is then from 0% to 100%. This is used for a more intuitive approach, but if only integer values are used, the range encompasses a total of only 101 intensities, which are insufficient to represent a broad gradient of grays. In computing, although the gray scale can be computed through rational numbers, image pixels are stored in binary, quantized form. Some early gray scale monitors can only show up to sixteen (4-bit) different shades, but today gray scale images (as photographs) intended for visual display (both on screen and printed) are commonly stored with 8 bits per sampled pixel, which allows 256 different intensities (i.e., shades of gray) to be recorded, typically on a non-linear scale. The precision provided by this format is barely sufficient to avoid visible banding artifacts, but very convenient for programming due to the fact that a single pixel then occupies a single byte.

Technical uses (e.g. in medical imaging or remote sensing applications) often require more levels, to make full use of the sensor accuracy (typically 10 or 12 bits per sample) and to guard against round-off errors in computations. Sixteen bits per sample (65,536 levels) is a convenient choice for such uses, as computers manage 16-bit words efficiently. The TIFF and the PNG (among other) image file formats generally support 16-bit gray scale natively, although browsers and many imaging programs tend to ignore the low order 8 bits of each pixel. In any regard, no matter what pixel depth is used, the binary representations one of skill in the art will presume that 0 is black and the maximum value (255 at 8 bpp, 65,535 at 16 bpp, etc.) is white, if not otherwise noted.

Conversion of a color image to gray scale is not unique; different weighting of the color channels effectively represent the effect of shooting black-and-white film with different-colored photographic filters on the camera and/or scanner. A common strategy is to match the luminance of the gray scale image to the luminance of the color image.

To convert any color to a gray scale representation of its luminance, first one must obtain the values of its red, green, and blue (RGB) primaries in linear intensity encoding, by gamma expansion. Then, add together 30% of the red value, 59% of the green value, and 11% of the blue value (these weights depend on the exact choice of the RGB primaries, but are typical). Regardless of the scale employed (0.0 to 1.0, 0 to 255, 0% to 100%, etc.), the resultant number is the desired linear luminance value; it typically needs to be gamma compressed to get back to a conventional gray scale representation.

As used herein, a "binary image" is a digital image that has only two possible values for each pixel. Typically the two colors used for a binary image are black and white though any two colors can be used. The color used for the object(s) in the image is the foreground color while the rest of the image is the background color. In the document scanning industry this is often referred to as bi-tonal.

Binary images are also called bi-level or two-level. This means that each pixel is stored as a single bit (0 or 1). The names black-and-white, B&W, monochrome or monochromatic are often used for this concept, but may also designate any images that have only one sample per pixel, such as gray scale images. In Photoshop parlance, a binary image is the same as an image in "Bitmap" mode.

Binary images often arise in digital image processing as masks or as the result of certain operations such as segmentation, thresholding, and dithering. A binary image is usually stored in memory as a bitmap, a packed array of bits. A 640×480 image can require 37.5 KB of storage. Because of the small size of the image files, fax machines and document management solutions usually use this format.

"Fibrous structure," as used herein, means an arrangement of fibers produced in any papermaking machine known in the art to create a ply of paper product or absorbent paper product. Other materials are also intended to be within the scope of the present invention as long as they do not interfere or counter act any advantage presented by the instant invention. Suitable materials may include foils, polymer sheets, cloth, wovens or nonwovens, paper, cellulose fiber sheets, co-extrusions, laminates, high internal phase emulsion foam materials, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Such materials can be homogeneous or composition combinations.

The terms "multi-layered tissue paper web, multi-layered paper web, multi-layered web, multi-layered paper sheet, multi-ply tissue product, and multi-layered paper product" are all used interchangeably herein to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined when wet to form a multi-layered tissue paper web. The plies of a multi-ply tissue product can be substantially homogeneous in nature or they can be multi-layered tissue paper webs.

As used herein, the term "single-ply tissue product" means that it is comprised of one ply of creped or uncreped tissue; the ply can be substantially homogeneous in nature or it can be a multi-layered tissue paper web.

As used herein, the terms "tissue paper web, paper web, paper sheet and paper product" are all used interchangeably to refer to sheets of paper made by a process comprising the steps of forming an aqueous papermaking furnish, depositing this furnish on a foraminous surface, such as a Fourdrinier wire, and removing the water from the furnish (e.g., by gravity or vacuum-assisted drainage), forming an embryonic web, transferring the embryonic web from the forming surface to a transfer surface traveling at a lower speed than the forming surface. The web is then transferred to a fabric upon which it is through air dried to a final dryness after which it is wound upon a reel.

The tissue paper of the present invention preferably has a basis weight ranging from between about 5 $g/m^2$ and about 120 $g/m^2$, more preferably between about 10 $g/m^2$ and about 75 $g/m^2$, and even more preferably between about 10 $g/m^2$ and about 50 $g/m^2$. The soft tissue paper of the present invention preferably has a density ranging from between about 0.01 $g/cm^3$ and about 0.19 $g/cm^3$, more preferably between about 0.02 $g/m^3$ and about 0.1 $g/cm^3$, and even more preferably between about 0.03 $g/cm^3$ and about 0.08 $g/cm^3$.

The tissue paper of the present invention further comprises papermaking fibers of both hardwood and softwood types wherein at least about 50% of the papermaking fibers are hardwood and at least about 10% are softwood. The hardwood and softwood fibers are most preferably isolated by relegating each to separate layers wherein the tissue comprises an inner layer and at least one outer layer.

The tissue paper product of the present invention is preferably creped, i.e., produced on a papermaking machine culminating with a Yankee dryer to which a partially dried papermaking web is adhered and upon which it is dried and from which it is removed by the action of a flexible creping blade.

Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation. A Yankee dryer is a large diameter, generally 8-20 foot drum which is designed to be pressurized with steam to provide a hot surface for completing the drying of papermaking webs at the end of the papermaking process. The paper web which is first formed on a foraminous forming carrier, such as a Fourdrinier wire, where it is freed of the copious water needed to disperse the fibrous slurry is generally transferred to a felt or fabric in a so-called press section where de-watering is continued either by mechanically compacting the paper or by some other de-watering method such as through-drying with hot air, before finally being transferred in the semi-dry condition to the surface of the Yankee for the drying to be completed. While the characteristics of the creped paper webs, particularly when the creping process is preceded by methods of pattern densification, are preferred for practicing the present invention, un-creped tissue paper is also a satisfactory substitute and the practice of the present invention using un-creped tissue paper is specifically incorporated within the scope of the present invention. Un-creped tissue paper, a term as used herein, refers to tissue paper which is non-compressively dried, most preferably by through-drying. Resultant through air dried webs are pattern densified such that zones of relatively high density are dispersed within a high bulk field, including pattern densified tissue wherein zones of relatively high density are continuous and the high bulk field is discrete.

To produce un-creped tissue paper webs, an embryonic web is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

Tissue paper webs are generally comprised essentially of papermaking fibers. Small amounts of chemical functional agents such as wet strength or dry strength binders, retention aids, surfactants, size, chemical softeners, crepe facilitating compositions are frequently included but these are typically only used in minor amounts. The papermaking fibers most frequently used in tissue papers are virgin chemical wood pulps. Additionally, filler materials may also be incorporated into the tissue papers of the present invention.

As used herein a "user unit" is utilized for the web substrates subject to the respective test method. As would be known to those of skill in the art, bath tissue and paper toweling are typically provided in a perforated roll format where the perforations are capable of separating the tissue or towel product into individual units. A "user unit" is the expected least amount of finished product unit that a consumer would utilize in the normal course of product use. In this way, a single-, double-, or even triple-ply finished product that a consumer would normally use would have a value of one user unit. For example, a common, perforated bath tissue or paper towel having a single-ply construction would have a value of 1 user unit between adjacent perforations. Similarly, a single-ply bath tissue disposed between three adjacent perforations (each across any one entire dimension of the product) would have a value of 2 user units. Likewise, any two-ply finished product that a consumer would normally use and is disposed between adjacent perforations would have a value of one user unit. For purposes of facial tissues that are not normally provided in a roll format, but as a stacked plurality of discreet tissues, a facial tissue having one ply would have a value of 1 user unit. An individual two-ply facial tissue product would have a value of one user unit, etc.

"Web materials" or 'web substrates" as used herein include products suitable for the manufacture of articles upon which indicia may be imprinted thereon and substantially affixed thereto. Web materials suitable for use and within the intended disclosure include fibrous structures, absorbent paper products, and/or products containing fibers. Other materials are also intended to be within the scope of the present invention as long as they do not interfere or counter act any advantage presented by the instant invention. Suitable web materials may include foils, polymer sheets, cloth, wovens or nonwovens, paper, cellulose fiber sheets, co-extrusions, laminates, high internal phase emulsion foam materials, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Such materials can be homogeneous or composition combinations.

Web materials also include products suitable for use as packaging materials. This may include, but not be limited to, polyethylene films, polypropylene films, liner board, paperboard, cartoning materials, and the like. Additionally, web materials may include absorbent articles (e.g., diapers and catamenial devices). In the context of absorbent articles in the form of diapers, printed web materials may be used to produce components such as back sheets, top sheets, landing zones, fasteners, ears, side panels, absorbent cores, and acquisition layers. Descriptions of absorbent articles and components thereof can be found in U.S. Pat. Nos. 5,569,234; 5,702,551; 5,643,588; 5,674,216; 5,897,545; and 6,120,489; and U.S. Patent Publication Nos. 2010/0300309 and 2010/0089264.

As used herein, one of skill in the art will recognize that the machine direction (MD) is the plane associated with the direction of travel of a web substrate through any processing (e.g., converting, printing, etc.) equipment. One of skill in the art will recognize that the cross-machine direction (CD) is the direction coplanar and orthogonal thereto. One of skill in the art will recognize that the Z-direction is orthogonal to both the CD and MD.

The process of the present invention provides generally, a method for the determination of various product attributes resulting from the analysis of the pixels of image files and/or gray scale images of those products. While the processes and products described herein are generally directed toward web substrates that have been subjected to various photographic and scanning techniques that result in the production of gray scale image files, one of skill in the art will readily recognize that the analytical methods provided herein can also be adapted for use with full color scan image files as well as any other file type that provides some form of color differentiation between adjacent pixels of the scanned image.

Similarly, the products analyzed herein are only exemplary embodiments. It would be readily recognized by one of skill in the art that virtually any product that can be scanned or photographed and the resulting to produce and image file can be so analyzed for the desired attribute sought. In other words, the examples and techniques provided herein are merely exemplary and non-limiting and should not be considered exclusively limited.

EXAMPLES

An apparatus and method for quantifying the number of fibers emanating from a surface (also used interchangeably with "free fiber measurement system" and "free fiber measurement" respectively herein) as well as the effective height of fibers emanating from a surface (also used interchangeably with "effective fiber height" herein) can utilize an image gathering apparatus to configure a web substrate such as a facial tissue, bath tissue, paper toweling, paper napkins, as well as other substrates on a suitable image scanner in order generate an image file. The image gathering apparatus is preferably capable of providing a scanned image of the web substrate. The method described herein can then use software to measure the number of free fibers emanating from the surface along a length of tissue and the average effective free fiber height from the recorded image(s). The free fiber measurement system generally includes a testing apparatus, an imaging system, and computer-based image analysis software.

Test Apparatus

Referring to FIG. 1, an exemplary and non-limiting image gathering apparatus 10 suitable for use to create an image of the fibers extending from the surface of a web substrate 12 (i.e., Z-direction fibers) along the length and/or width of a web substrate 12 can generally comprise the following equipment:

(1) Image scanner 14—one of skill in the art will recognize that virtually any image scanner 14 capable of creating an image file suitable for the method of the present invention is suitable for the purposes of the present invention. For purposes of this disclosure, an exemplary but non-limiting suitable image scanner 14 is an Epson Perfection V 700 Photo. It is preferred that any scanner selected can provide an image with a resolution of at least about 50 dpi, or at least about 300 dpi, or at least about 1200 dpi, or at least about 9600 dpi. The flat bed desktop digital image scanner 14 mentioned herein can be provided with the following specifications:
Document Type Reflective
Document Source: Document Table
Auto Exposure Type: Photo
Image Type: 16-bit Gray scale
Resolution: 2400 dpi
Adjustments: Unsharp Mask (ON, Level=High)
  Dust removal (On, Level=High)

Further details of the image scanner 14 are discussed infra.

(2) Sample holder 22—one of skill in the art will recognize that sample holder 22 is preferably used to position a suitably prepared web substrate 12 on the image scanner bed 18. The exemplary sample holder 22 preferably positions the web substrate 12 upon the image scanner bed 18 in order to facilitate the image scanner 14 creating an image of fibers extending from the web substrate 12 in the Z-direction. Further details of the sample holder 22 are discussed infra.

(3) A reflection minimizing insert 20—further details of the reflection minimizing insert 20 are discussed infra.

It should be realized by one of skill in the art that each component of the sample holder 22 can be made with any suitable material. It is further preferred that each component is constructed from materials made using Fused Deposition Modeling (FDM) technology The sample holder 22 is generally formed from two portions: the sample holder frame 16 and the substrate holder 24. The sample holder frame 16 is preferably designed to permit the precise and repeatable placement of the sample holder 22 on the image scanner bed 18 of the image scanner 14. The sample holder frame 16, preferably removable, attaches to the image scanner bed 18. One of skill in the art could provide such releasable attachment by the placement of notches, detents, guides, and the like positioned upon the image scanner bed 18 or the image scanner 14.

The substrate holder 24 is generally configured to provide the web substrate 12 with suitable and/or adequate tension. It was also found that the substrate holder 24 can also position the web substrate 12 into a fixed position within the sample holder 22 and the resulting substrate holder 22 positioned relative to the image scanner bed 18 in a consistent manner to facilitate imaging of the fibers extending from the web substrate 12 in the Z-direction along the length of the web substrate 12.

Figure 2:
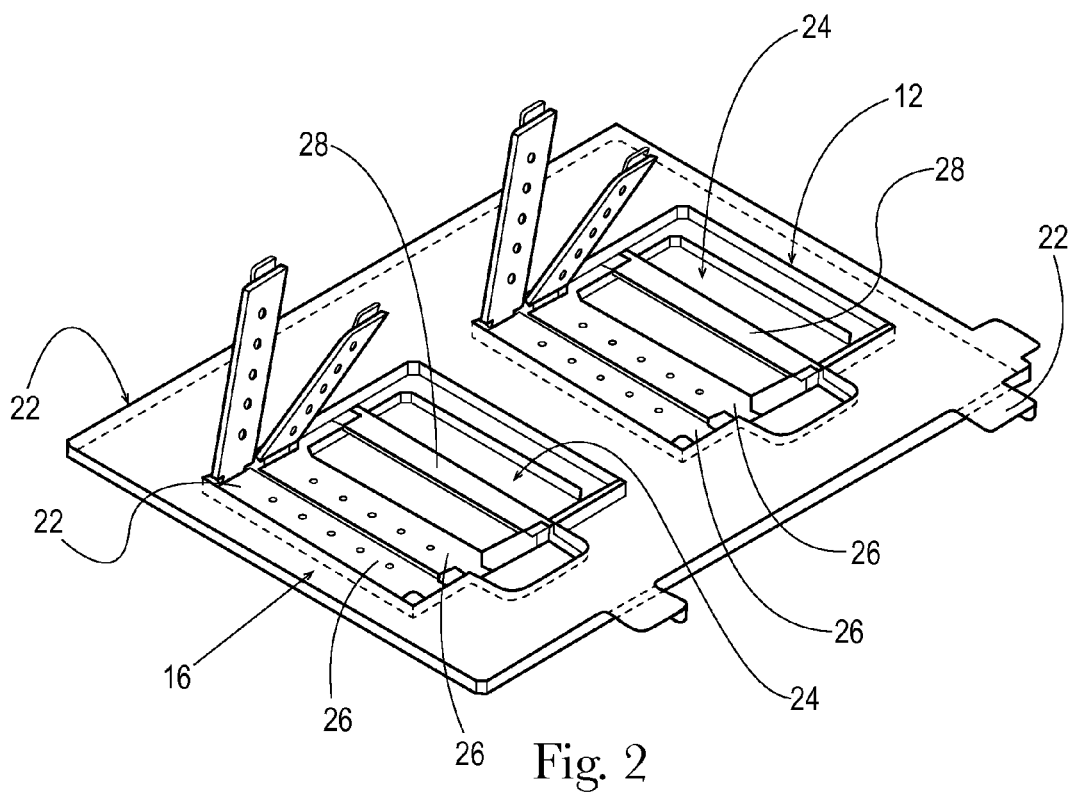
FIG. 2 is an exemplary rendering of a frame and removable holder suitable for holding a product such as a web substrate suitable for use with the current invention.

Referring to FIG. 2, the sample holder frame 16 preferably and generally comprises two press-fit latches 26 that are used to secure the web substrate 12 once it has been looped over a shim 28. By way of non-limiting example, shim 28 can be provided as a thin metal bar. A suitable shim 28 for use with a single user unit thickness of bath tissue and facial tissue, independent of the number of plies, was found to have a thickness of about 0.064 cm.

Referring again to FIG. 1, reflection minimizing insert 20 can be designed to minimize any background reflection from the image scanner 14 glass top caused by the scanner light and can also provide a contrasting background to assist in the analysis of the web substrate 12. In a preferred embodiment, the reflection minimizing insert 20 is formed by a process utilizing fused deposition modeling (FDM) and is attached to the notches typically found on top section of the chosen scanner. It should be readily realized that the reflection minimizing insert 20 can be designed and formed using any process available. One of skill in the art will understand that it would be advantageous to provide the reflection minimizing insert 20 as a black felt material. Additionally, one of skill in the art will recognize that reflection minimizing insert 20 maybe attached or provided as unattached to the top section of the scanner. For example, the reflection minimizing insert 20 can be placed directly onto the sample holder frame 16 before or after the sample holder frame 16 is placed in position for scanning by image scanner 14.

Experimental Protocol

For the exemplary method described herein, each sample of web substrate 12 is prepared for testing according to the following process:

The web substrate 12 to be tested (by way of non-limiting example, bath tissue) is preferably cut to a length of at least 20 cm, its width being equal to the standard user unit of the web substrate 12. The sample is preferably conditioned at normal room temperature (e.g., 30° C.±1° C.) and humidity (e.g., ~40%±5%) for at least 2 hours.

The sample of web substrate 12 is placed on the sample holder frame 16 such that it loops over the shim 28 in either the MD or CD of the web substrate 12. The region over the shim is preferably not the perforated region of the web substrate 12 (generally disposed in the CD) or an edge of the web substrate 12 (generally in the MD) as these regions may not be representative of the remainder of the sample that has not been subjected to a mechanical cutting, slitting, and/or perforating apparatus. For exemplary purposes only, the shim 28 is provided with the dimensions: length=10.6 cm, width=1.35 cm, and thickness 0.064 cm. Preferably, the web substrate 12 is positioned over shim 28 and positioned within sample holder frame 16 so that the length of web substrate 12 disposed on both sides of shim 28 are approximately equal.

Figure 4:
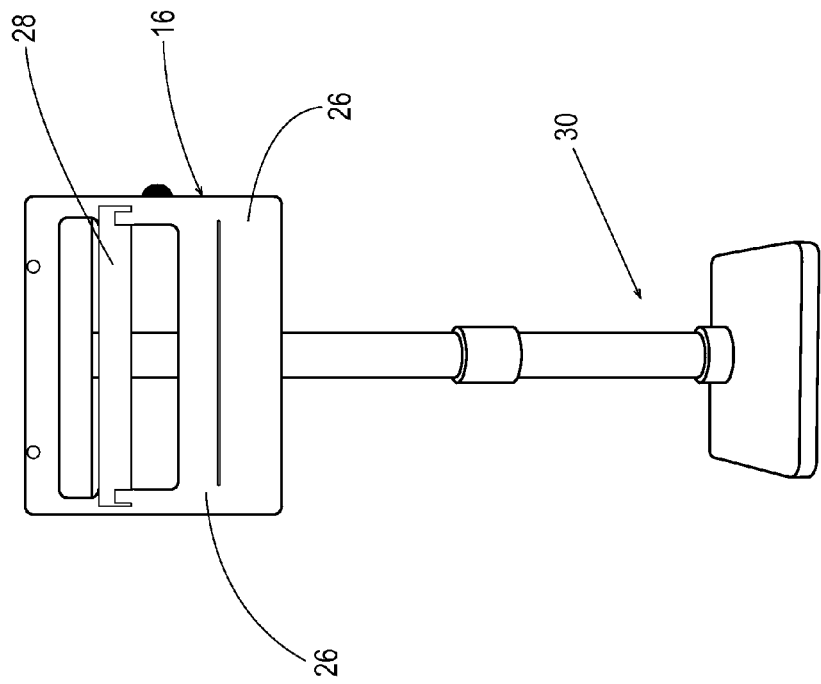
FIG. 4 is a photomicrograph of a perspective view of an exemplary stand with an exemplary holder suitable for use with the current invention.
Figure 3:
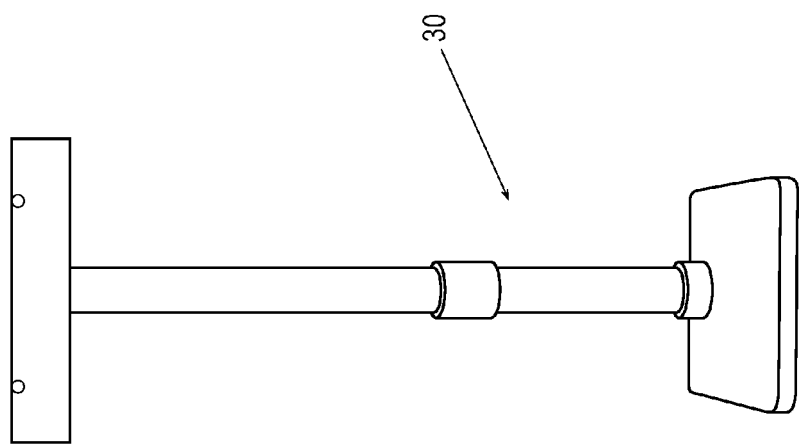
FIG. 3 is a photomicrograph of a perspective view of an exemplary stand suitable for holding an exemplary holder suitable for use with the current invention.

As shown in FIGS. 3-5, sample holder frame 16 is then preferably affixed on stand 30. In this manner, it is believed that the web substrate 12 can be subjected to an applied tension in an effort to reduce the angle disposed between web substrate 12 and shim 28. One of skill in the art will recognize that reducing the overall angle disposed between web substrate 12 and shim 28 can practically increase the 'edge-like' qualities suitable for creating an image suitable for analysis of the web substrate disposed over shim 28.

In order to present a more 'edge-like' appearance of the web substrate 12 for analysis by the method described herein, it may be desirable in to provide a tension to the web substrate 12 disposed over and about shim 28. One of skill in the art will recognize many methods to provide such tension. However, one particularly useful solution was to affix a known weight to the ends of the tissue sample disposed over shim 28. One of skill in the art will appreciate that such a known weight is preferably affixed across the entire width of web substrate 22. For the analysis described herein, a weight of 185 gm was found to provide suitable tension in a direction vertically downward (i.e., generally parallel to the Earth's gravitational field) for bath tissue and facial tissue products. Naturally, one of skill in the art can provide tension to the web substrate 12 disposed upon sample holder frame 16 in any orientation—vertically downward, horizontally, or otherwise. In any regard it is desired to provide sufficient tension to the ends of the web substrate 12 draped over shim 28 in the MD, CD, or combination thereof, in an effort to reduce the overall angle disposed between shim 28 and the web substrate 12 draped overtherefrom. One of skill in the art will appreciate that the amount of weight affixed to the web substrate 12 can be chosen based upon the known, or even presumed, physical characteristics of the web substrate 12 to be analyzed. By way of non-limiting example, paper toweling may require a significant weight to be affixed in order to provide the desired edge-like appearance to the web substrate 12. Thus, some factors to consider in selecting a suitable weight to affix to the web substrate 12 include, but are not limited to, web substrate 12 basis weight, density, number of plies, flexural modulus, drape, combinations thereof, and the like.

Next the press-fit latches 26 are then pressed down to secure the tensioned sample in place. Any tensioning weight used is then removed. The resulting sample of web substrate 12 disposed within sample holder frame 16 is shown in an exemplary but non-limiting manner in FIG. 6. The combined sample holder frame 16 with sample is then placed into the sample holder 22 disposed upon the bed of the image scanner 14, and the image scanner 14 top closed for imaging and generation of the image file. An exemplary but non-limiting image scanner 14 set-up is provided infra. In a preferred embodiment, a calibration image corresponding to the same region of interest is recorded (a preferred calibration scale can be provided with graduated markings of 0.1 mm resolution) for each web substrate 12 to be analyzed.

It is preferred that prior to the generation of each image file, that appropriate care is taken to clean the glass surface of the image scanner 14 and all parts cooperatively associated thereto. Additionally, one of skill in the art will appreciate that appropriate care be taken to refrain from impacting the web substrate 12 in order to provide the best image possible of the web substrate 12.

Alternatively, web substrate 12 can be prepared for analysis in a manner consistent with the present disclosure by the use of microtoming. In this alternative exemplary but non-limiting embodiment, one face of a user unit of web substrate 12 sample can be embedded into an epoxy resin or wax block or cryogenically frozen. A sectioning instrument can then cut thin slices of the web substrate 12 sample in the MD, CD, or any combination thereof, into sections. One of skill in the art will easily recognize that microtomy can be used to provide microtome sections having thicknesses ranging between 0.05 and 100 µm. Exemplary microtomes suitable for use in providing samples of web substrate 12 suitable for use with the present method can include sledge microtomes, rotary microtomes, cryomicrotomes, ultramicrotomes, vibrating microtomes, saw microtomes, laser microtomes, and the like. The sample can then be directly disposed upon the bed of the image scanner 14, and the image scanner 14 top closed for imaging and generation of the image file.

For the exemplary method described herein, the generated image file should contain at least a two-dimensional image of a web substrate where at least one dimension of the image file contains at least a component of the web substrate in the Z-direction. For purposes of the exemplary method described herein, the generated image file will provide an image of an edge of the web substrate whether the edge is produced by the apparatus discussed supra, microtoming, or by any other method known to those of skill in the art for practicing the process described herein. Additionally, for purposes of this disclosure, A. Image Analysis Program While it is possible that a wide plurality of image processing systems can be used to analyze the image file of web substrate 12, it was found that reasonable image processing can be achieved using readily available mathematics software such as MATLAB. The bold font used below denotes standard functions available within the MATLAB software. Exemplary commented code developed for this analysis is provided in Section E infra.

Figure 7:
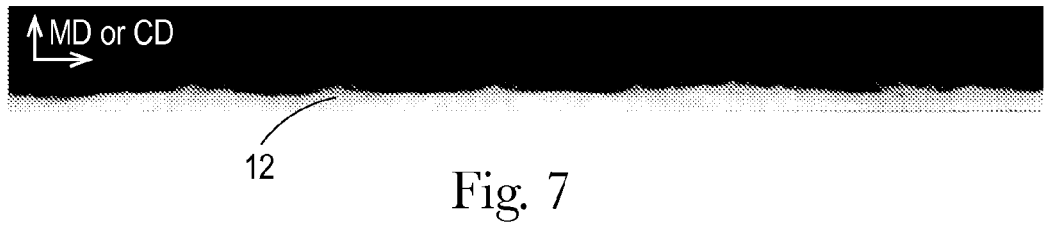
FIG. 7 is a photomicrograph of an exemplary tissue product showing free fibers emanating from a surface thereof.
Figure 8:
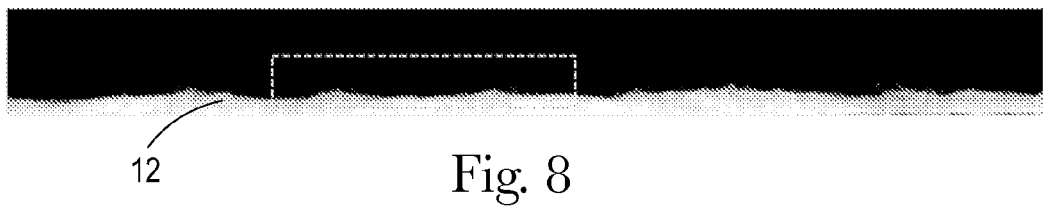
FIG. 8 is a photomicrograph of an exemplary tissue product showing free fibers emanating from a surface thereof with a region of interest (ROI) selected.
Figure 9:
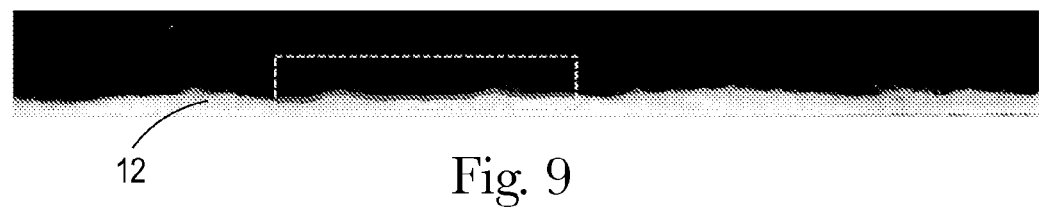
FIG. 9 is a photomicrograph of an exemplary tissue product showing free fibers emanating from a surface thereof with a region of interest (ROI) selected and a baseline filtered using an exemplary low pass butter filter, having an exemplary cut-off frequency of 30 Hz and an order of 5, determined.
Figure 10:
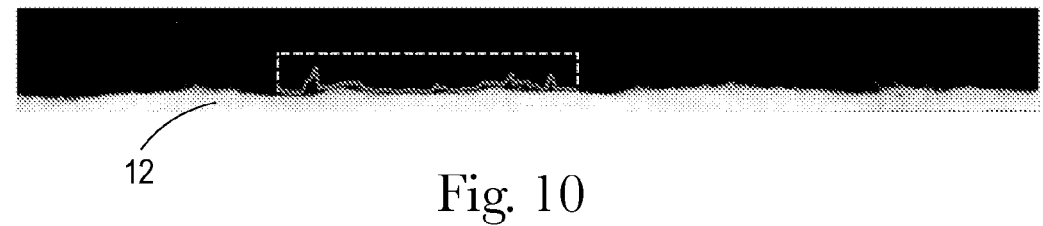
FIG. 10 is a photomicrograph of an exemplary tissue product showing free fibers emanating from a surface thereof with a region of interest (ROI) selected and an overall profile filtered using an exemplary low pass butter filter, having an exemplary cut-off frequency of 30 Hz and an order of 5, determined.

Referring to FIGS. 7-12, an exemplary, but non-limiting image analysis program/code is described by the following steps:

1. Referring to FIG. 7, the image file is loaded into MATLAB and contrast is corrected using the standard imadjust.m function. The width and height of the image is denoted by a component of the MD or CD directions, and Z-direction, respectively.
2. Referring to FIG. 8, the graphic interface allows the user to select a rectangular region of interest (ROI) having a width of length, L, orthogonal to the Z-direction of the web substrate shown in the image by clicking and dragging the mouse.
3. Referring to FIG. 9, the program preferably uses the standard im2bw.m and edge.m function to convert the image in Step 1 of this Section to a binary format and reduce the resultant to an image with only an edge profile that represents where the pixel intensity transitions from white to black. Exemplary, but non-limiting specifications of the edge.m function are: edge finding method='Canny'.
4. The position coordinates (x (width: a position along L), Z (height)) of each pixel of the edge profile is identified by measuring pixel intensity along Z (height of the image) for a single line of pixels measured using the improfile.m function. For a given x position, the coordinates of the last pixel along Z with intensity greater than zero is recorded. By convention and for non-limiting purposes, the top left corner of the image represents the origin (0, 0).
5. The analysis in Step 4 of this Section is repeated across the length, L, of the image selected in Step 3 of this Section to create a matrix of pixel positions.
6. The edge profile is obtained from the matrix of pixel positions created in Step 5 of this Section after interpolating within the matrix using the interp1.m function to ensure that every x position has an associated pixel across the width of the image selected in Step 3 of this Section. For non-limiting purposes, specifications of the interp1.m function are: method='spline' used in extrapolation for elements outside the specified interval.
7. As shown in FIG. 9, the edge profile from Step 6 of this Section is then filtered using a low pass butter filter with the exemplary specifications of a cut-off frequency=100 Hz and order=5 to create a Z-direction baseline.

A. Calibration

In one embodiment of the present invention length calibration can be accomplished by determining the pixel to centimeter conversion factor. One of skill in the art will appreciate that this process involves determining the number of pixels that make up the actual physical distance between two points using the getline.m function. Generally, one of skill in the art can use a scale with graduated markings 0.01 cm apart. For non-limiting purposes, the size of the calibration image must be the same as that of the web substrate image analyzed.

B. Estimating the Average Effective Height of the Free Fibers

In this embodiment, an exemplary and non-limiting program uses the standard imfilter.m and edge.m function to convert the image file to an image with a single line of pixels with intensity equal to one (white).

Figure 11:
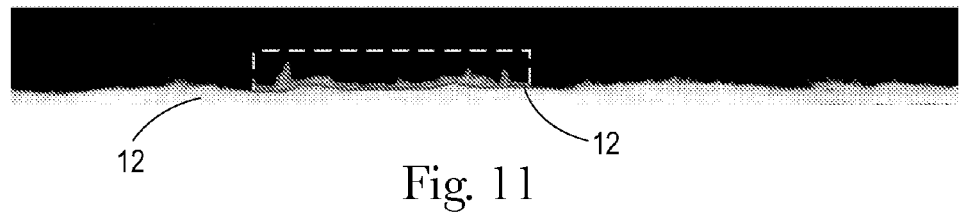
FIG. 11 is a photomicrograph of an exemplary tissue product showing free fibers emanating from a surface thereof with a region of interest (ROI) selected suitable for determining the area enclosed between the desired line profiles filtered using an exemplary low pass butter filter having an exemplary cut-off frequency of 30 Hz and an order of 5.

1. Specification of the imfilter.m function can be provided preferably as a two dimensional filter (fspecial.m)='unsharp'. Specifications of the edge.m function can be: edge finding method='Canny'.
2. The function improfile.m is used to determine from the image generated above the position coordinates of the first pixel along Z (height of the image), the location of a pixel with intensity equal to one.
3. The analysis performed in Step 2 in this Section is repeated across the width of the ROI (length, L) identified in Step 2 from Section A above.
4. The edge profile obtained by creating a matrix with all the pixel positions identified in Step 3 in this Section is interpolated using the interp1.m function to ensure that the profile is described for every x position across the width of the image selected in Step 2 from Section A above. Specifications of the interp1.m function are: method='spline' used in extrapolation for elements outside the specified interval.
5. The edge profile from Step 4 in this Section is then filtered using a low pass butter filter having the exemplary specifications: Cut-off frequency=100 Hz and order=5. All Z-coordinate values along the edge profiles measured here with values greater than the corresponding Z-direction baseline estimated in Step 7 of Section A above are made equal to it.
6. The function trapz.m numerically integrates the area under the edge profile identified in Step 5 in this Section.
7. The function trapz.m numerically integrates the area under the Z-direction baseline identified in Step 7 in Section A above.
8. The net area or area enclosed between the two profiles is given by the magnitude of the difference in the absolute values of the areas estimated in Steps 6 and 7 in this Section.
9. The net area from Step 8 in this Section divided by the width of the ROI (length, L) gives the average effective height of the free fibers in pixels.
10. Referring to FIG. 11, using the calibration constant estimated in Section B the average effective height of the free fibers can be converted to centimeters.

C. Estimating the Number of Free Fibers

Figure 12:
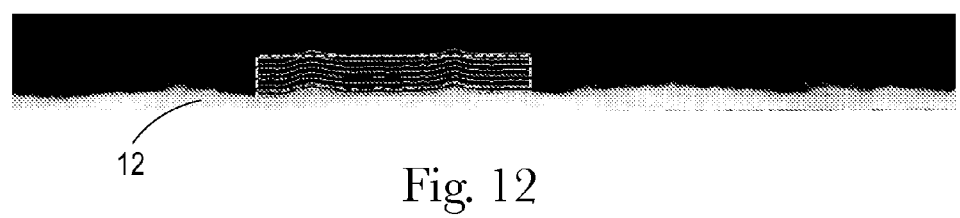
FIG. 12 is a photomicrograph of an exemplary tissue product showing free fibers emanating from a surface thereof with a region of interest (ROI) selected suitable for determining the number of free fibers counted at successive line profiles with a fixed inter-layer distance (ILD) between them; and, FIG. 13 is a graphical representation of the number of free fibers determined at successive line profiles with a fixed inter-layer distance (ILD) between them.
Figure 13:
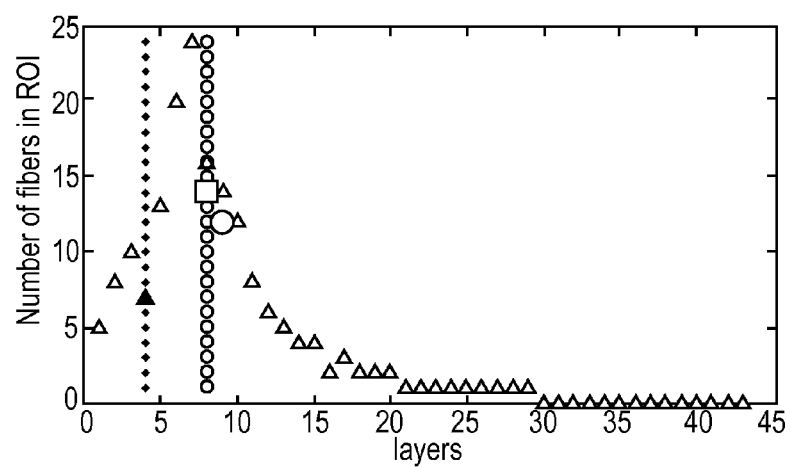

1. Pixel intensities along an edge profile across the width of the selected ROI in Step 3 from Section A above is recorded using the improfile.m function. The Z-direction baseline obtained in Step 7 from Section A above with the Z position of each pixel offset by a fixed factor can be considered a line profile.
2. The threshold intensity values for the web substrate image are obtained by processing the intensity of pixels that exist within the bounds described by the maximum Z coordinate of the image and the maximum Z-coordinate of the ROI. A suitable threshold may be developed by averaging the maximum in the derivative of the intensity (after it has been filtered using a low pass butter filter with the exemplary specifications of a cut-off frequency=30Hz and order=1) along each line of pixels orthogonal to the Z-direction (downwards) within the section of the ROI described above.
3. As shown in FIG. 12, the pixel intensities of the line profile are recorded as in Step 1 in this Section between the following Z coordinate limits:
   a. START: Offset a fixed distance in the Z-direction below the Z-direction baseline identified in Step 7 in Section A above. The fixed distance is two-thirds the distance between the minimum Z values of the Z-direction baseline and ROI.
   b. STOP: at a height in the image in where the mean height of pixels in the line profile is greater than the height of the ROI.
4. One of skill in the art can choose an ILD (inter-layer distance) of 1 pixel but in the interest of computational time it may be preferred to use an ILD value that is a function of the Z-variation in the Z-direction baseline measured in Step 7 of Section A.
5. The intensities recorded for each line profile in Step 3 in this Section can be smoothed using a moving average method.
6. For each line of pixel intensities processed in Step 5 in this Section the first derivative of intensity is computed. Peaks in the intensity derivative represent the transitions from black to white or vice versa.
7. The intensity derivative calculated in Step 6 in this Section is filtered using a low pass butter filter (exemplary and non-limiting cut off frequency=100 Hz and order=5).
8. The extrema.m function is used to identify the peaks in each profile conditioned in Step 7 in this Section. Exemplary, but non-limiting peak identification function used like extrema.m can be obtained at: http://www.mathworks.com/matlabcentral/fileexchange/12275
9. The numbers of peaks identified in Step 8 in this Section with intensity values greater than the threshold value (from Step 2 in this Section) are counted.
10. Referring to FIG. 14, the number of free fibers can be graphically presented. The number of free fibers can then be approximated as a percentage of the maximum number of free fiber in a layer that occurred above a fixed distance from the base profile. It was surprisingly found that 90% and 0.1 mm distance are values that provide consistent results however, it should be understood that any percentage and distance values could be used as provided herein with success.
11. Using the calibration constant from the Calibration section (Section B) above, the number of free fibers per centimeter can be estimated.

D. Exemplary MATLAB Program for Use in Estimating the Effective Height of Free Fibers and Estimating the Number of Free Fibers in a Web Substrate The following code was found suitable for providing the above-described analysis and the ensuing calculation of the above-described metrics. It should be understood by one of skill in the art that the following commented code is completely exemplary and clearly non-limiting.

```
% The code below includes comments that are preceded by the '%' sign
close all;
clear all;
clear mex;
% CALIBRATING THE IMAGE
nameimg_cal='C:\DATA ANALYSIS\Curr_Bus\';
cal=input('Input the filename for calibration:','s');
filenamebase_cal=strcat(nameimg_cal,num2str(cal),'.tif');
mm_cal=imread(filenamebase_cal);
figure(88);
```

```
imshow(mm_cal);
CALIBVAL=input('Calibration length (in cm):'); % Input distance between the markers
hx hy]=getline;
new_CAL=CALIBVAL/sqrt((hx(2,1)-hx(1,1))^2+(hy(2,1)-hy(1,1))^2); % 1pixel = new_CAL cm
%% DETERMINING THE AVERAGE EFFECTIVE HEIGHT OF THE FREE FIBERS
%FILE SOURCE
nameimg='C:\DATA ANALYSIS\Curr_Bus\XX.tif';
rr=colormap(jet);
mm=imread(nameimg); %Read in the image file
mm_kg=imadjust((mm));
figure(612);
imshow(mm_kg) % Show the read image
%imshow(mm_kg);
title('Original image with scale bar');
uiwait(msgbox('********NOTE: Get calibration image if ROI has been changed*******','Title','modal')); %Request for calibration to be done
%SELECTING ANALYSIS REGION
crop_lim=getrect;       %xmin ymin width height
ulim=crop_lim;
xcrop=[crop_lim(1,1) crop_lim(1,3)+crop_lim(1,1) crop_lim(1,3)+crop_lim(1,1) crop_lim(1,1) crop_lim(1,1)];
ycrop=[crop_lim(1,2) crop_lim(1,2) crop_lim(1,2)+crop_lim(1,4) crop_lim(1,2)+crop_lim(1,4) crop_lim(1,2)];
figure(61); hold on;
plot(xcrop,ycrop,'y--','LineWidth',2);
figure(61);
% FIBER EDGE DETECTION
h=fspecial('unsharp');
BWM=imfilter(mm_g,h);
BW1 = edge(BWM,'canny'); %EDGE PROFILE DETECTION
imshow(BW1);
BWG=im2bw(mm_g); %Z-DIRECTION BASELINE DETECTION
BW2 = edge(BWG,'canny');
figure(343)
imshow(BW2)
figure(454);
subplot(2,1,1)
imshow(BW1) %EDGE PROFILE IMAGE
subplot(2,1,2)
imshow(BW2); %BASE PROFILE IMAGE
%VARIABLES USED
tot_ggy=[ ];
tot_ggx=[ ];
over_gg=[ ];
tt=0;
over_I=[ ];
over_pos=[ ];
over_S=[ ];
over_Spos=[ ];
figure(61); imshow(mm_g); set(gcf,'color','white');
%Z-DIRECTION BASELINE AND EDGE PROFILE IDENTIFICATION
    for ii=fix(ulim(1,1)):fix((ulim(1,1)+ulim(1,3)))
        xx=[ ];
        yy=[ ];
        yy = fix(ulim(1,2)):(fix(ulim(1,2))+fix(ulim(1,4)));
        xx = ii + zeros(1,fix(ulim(1,4))+1);
        clear gg gg_x gg_y ss ss_x ss_y;
        [gg_x,gg_y,gg] = improfile(BW1,xx,yy); %EDGE PROFILE
        [ss_x,ss_y,ss] = improfile(BW2,xx,yy); %Z-DIRECTION BASELINE
            S=find(ss>0,1,'last'); % IDENTIFY THE LAST PIXEL WITH INTENSITY > 0
            if ulim(1,2)<S<(ulim(1,2)+ulim(1,4))
              over_S=[over_S S+ulim(1,2)];
              over_Spos=[over_Spos ii];
              hold on;
              plot(ii,S+ulim(1,2),'co','MarkerSize',4); %Z-DIRECTION BASELINE
            end
            I=find(gg==1,1,'first'); % IDENTIFY THE FIRST PIXEL WITH INTENSITY = 1
            if I==0
              I=ulim(1,2);
            end
            if I>S
              I=S;
            end
        over_I=[over_I I+ulim(1,2)];
over_pos=[over_pos ii];
```

```
hold on;
plot(ii,I+ulim(1,2),'mo','MarkerSize',4); %OVERALL PROFILE
over_gg=[over_gg gg];
tot_ggx=[tot_ggx gg_x];
tot_ggy=[tot_ggy gg_y];
hold on;
end
figure(63);clf; imshow(mm_g);
%FILTERING/INTERPOLATING THE IDENTIFIED Z-DIRECTION
BASELINE AND EDGE PROFILES
    over_I(1,end)= mean(over_I);
    over_S(1,end)=mean(over_S);
    gh=butterfilter(interp1(over_pos,over_I,ulim(1,1):(ulim(1,1)+ulim(1,3)),'spline'.'extrap'),100,
5);
%interpolated intensity locations
sh=butterfilter(interp1(over_Spos,over_S,ulim(1,1):(ulim(1,1)+ulim(1,3)),'spline','extrap'),100,5);
    for bb=1:length(sh) %REMOVING ALL EDGE PROFILE ELEMENTS
THAT ARE LESS THAN THE CORRESPONDING Z DIRECTION
BASELINE VALUES
    if (gh(bb)-sh(bb)>0)
        gh(bb)=sh(bb);
    else
        gh(bb)=gh(bb);
    end
    end
    hold on;
    plot(ulim(1,1):(ulim(1,1)+ulim(1,3)),gh,'r.','MarkerSize',6)
    plot(ulim(1,1):(ulim(1,1)+ulim(1,3)),sh,'b.','MarkerSize',6)
    jbfill(ulim(1,1):(ulim(1,1)+ulim(1,3)),sh',gh','y')
%EFFECTIVE HEIGHT ESTIMATION
A1 =trapz(ulim(1,1):(ulim(1,1)+ulim(1,3)),gh);
A2=trapz(ulim(1,1):(ulim(1,1)+ulim(1,3)),sh);
A=abs(A1-A2); %units are pixel^2
Atot=A*new_CAL*new_CAL; %AEA AND ROI WIDTH CONVERTED TO cm USING THE
CALIBRATION CONSTANT
strip_width=ulim(1,3)*new_CAL;
Effective_height=Atot/strip_width;
%% ESTIMATING THE NUMBER OF FREE FIBERS PER CM
figure(61);
imshow(mm_g)
hold on
plot(xcrop,ycrop,'y--','LineWidth',2);
[Cx,Cy,C] = improfile(mm_g,ulim(1,1):(ulim(1,1)+ulim(1,3)),sh);
plot(Cx,Cy,'r--','LineWidth',2);
%FIXING #LAYERS AND INTER-LAYER DISTANCE (ILD)
kk=0;
tl=1; % Inter-layer distance (ILD) set to 1
crop_mm=mm_g;
start_pt=fix(2*(max(ycrop)-mean(Cy))/3); %START POINT FOR THE ANALYSIS
% Variables
ii=0;
x1=[ ];
y1=[ ];
over_gg=[ ];
over_gg_smt=[ ];
tot_yy=[ ];
gg_smt=[ ];
ii=kk;
% THRESHOLD VALUES FOR THE FOREGROUND AND BACKGROUND
figure(64);
imshow(mm_g)
title('Getting the foreground/background threshold values');
hold on
plot(xcrop,ycrop,'y--','LineWidth',2);
plot(Cx,Cy,'r.','LineWidth',2);
lj=size(mm_g);
tot_thresh=[ ];
max_hh=[ ];
for zz=0:(ulim(1,2)+ulim(1,4)-max(Cy))
    [hh_x,hh_y,hh] =
improfile(mm_g,ulim(1,1):(ulim(1,1)+ulim(1,3)),ones(length(ulim(1,1):(ulim(1,1)+ulim(1,3))),1)
*(max(Cy)+zz));
figure(64);
hold on;
plot(hh_x,hh_y,'g.');
tot_thresh =[tot_hresh max(butterfilter(diff(hh),30,1))];
end
thresh=mean(tot_thresh);
figure(64);
if ulim(1,2)-ulim(1,4)<0
```

```
        zz_up=ulim(1,2);
    else
        zz_up=ulim(1,4);
    end
    max_gg=[ ];
    tot_gg=[ ];
    for zz=0:zz_up-1
    [gg_x,gg_y,gg],
    improfile(mm_g,ulim(1,1):(ulim(1,1)+ulim(1,3)),ones(length(ulim(1,1):(ulim(1,1)+ulim(1,3))),1)
    *(ulim(1,2)-zz));
    figure(64);
    hold on;
    plot(gg_x,gg_y,'c.');
    tot_gg =[tot_gg max(butterfilter(diff(gg),30,1))];
    end
    bkg_val=mean(tot_gg);
    ds=100;
    gg=[4000]; %initializing gg
    %IDENTIFYING THE #LAYERS
    while ((max(Cy(1:end,1)-(tl*ii)+start_pt)> min(ycrop))) % STOP COUNTING THE
    NUMBER OF FREE FIBERS WHEN LINE PROFILE GOES OUT OF THE ROI
        xx=[ ];
        yy=[ ];
        %gg=[ ];
        kk=kk+1; %counts number of layers
            ii=kk;
        xx = [Cx(1:end,1)];
        yy = [Cy(1:end,1)-(tl*ii)+start_pt]; % add offset to the start point of analysis
        [gg_x,gg_y,gg] = improfile(crop_mm,xx,yy);
        x1=[x1 xx];
        y1=[y1 yy];
            tt=size (gg);
            R=rem(kk,5);
        if(R==0)
            %ii=kk;
                figure(610);
                %imshow(crop_mm);
                %plot(1:tt(1,1),gg,'Color',[fix(rr(fix(ii),1)*64/ds) fix(rr(fix(ii),2)*64/ds)
    fix(rr(fix(ii),3)*64/ds)]);
                plot(1:tt(1,1),gg,'Color','y');
                %plot(xx,gg,'c');
                xlabel('x position (pix)');
                %ylabel('pixel intensity');
            figure(61);
            %plot(gg_x,gg_y,'Color',[fix(rr(fix(ii),1)*64/ds) fix(rr(fix(ii),2)*64/ds)
    fix(rr(fix(ii),3)*64/ds)],'LineWidth',1);
            plot(gg_x,gg_y,'Color',y,'LineWidth',1);
            end
        over_gg=[over_gg gg];
        tot_yy=[tot_yy Cy(1,1)-(tl*ii)];
        hold on;
    end
    figure(61); zoom off;
    title(strcat('Number of layers:',num2str(kk),' Layer thickness (pix): ',num2str(tl)));
    % SMOOTHING THE INTENSITY PROFILE
    for jj=1:kk
        Sze_gg=size(over_gg(:,jj));
        %%% jj=1;
        for ii = 3:Sze_gg(1,1)-2
            gg_smt(ii,jj) =(over_gg(ii-2,jj)+2*over_gg(ii-1,jj)+3*over_gg(ii,jj)+2*over_gg(ii+1,jj)+
    over_gg(ii+2,jj))/9;
        end
            figure(68);clf;set(gcf,'color','white');
            plot(over_gg(:,jj),'r','LineWidth',2);
            hold on
            plot(gg_smt(:,jj),'b-','LineWidth',1);
            ylabel('Pixel intensity');
            xlabel('x position of pixel');
            title(strcat('Smoothing out the intensity data-layer number: ',num2str(jj)));
    end
    % ESTIMATING/COUNTING INTENSITY PEAKS/FIBERS
    %Variables
    tot_dd=[ ];
    det_gg=[ ];
    tot_dd=[ ];
    figure(67);
    det_gg =diff(gg_smt(:,kk));
    %kk=4;
    for ii=1 :kk
        dd=0;
```

-continued

```
    det_gg(:,ii) = diff(gg_smt(:,ii));
    figure(65);
    axis(0 5000 -2000 2000]);
    plot(det_gg(:,ii),'Color','k');
    hold on;
    set(gcf,'color','white');
    xlabel('index');
    ylabel('derivative of intensity');
    clear filt_det num_det
    num_det=find(extrema(smooth(butterfilter(det_gg(:,ii),100,1),7))>thresh); % Picking peaks
in intensity derivative
    dd=length(num_det); %we include the -1 to account for the initial pixel transition
    if dd % REMOVE POSSIBLITY OF NEGATIVE NUMBER OF FIBERS
        dd=0;
    else
        dd=dd;
    end
    figure(67);
    plot(ii,dd,'','Color','k','MarkerSize',6,'LineWidth',2,'MarkerFaceColor','g');
    hold on
    tot_dd=[tot_dd dd];
end
figure(67);
hold on; plot(ones(1,length(1:max(tot_dd))).* fix(start_pt/tl),1:max(tot_dd);'k.');
set(gcf,'color','white');
xlabel('layers');
ylabel('Number of fibers in ROI');
%IDENTIFYING THE LAYER CORRESPONDING TO THE 0.01cm CONDITION
count_layer = fix(0.01/(new_CAL*d));figure(67); hold on;
plot(ones(1,length(1:max(tot_dd))).* fix(start_pt/tl+count_layer),1:max(tot_dd),'ro');
plot(fix(start_pt/tl+count_layer),fix(max(tot_dd(fix(start_pt/tl+count_layer):end))*0.9),'ys','Mark
erSize',12,'MarkerFaceColor','r');
plot(fix(start_pt/tl+count_layer)+1,fix(max(tot_dd(fix(start_pt/tl+count_layer)+1:end))*0.9),'yo','
MarkerSize',12,'MarkerFaceColor','b');
figure(61);
plot(Cx,Cy-(count_layer*tl),'c--','LineWidth',1);
% ESTIMATING THE NUMBER OF FREE FIBERS
Number_of_free_fibers_per_unit_length=
fix((max(tot_dd(fix(start_pt/tl+count_layer)+1:end))/strip_width)*0.9); %90% the maximum is
taken as peak number of fibers
BEFNumber_of_free_fibers_per_unit_length=
fix((max(tot_dd(fix(start_pt/tl+count_layer):end))/strip_width)*0.9); %90% the maximum is
taken as peak number of fibers
```

It was found that the process of the present invention can also be used to quantify other useful metrics (e.g., physical parameters) for various web substrates having fibers, filaments, threads, and the like extending from a surface thereof. This can include, but is not limited to:

Number of Free Fiber (FP) spatial distribution
From the image obtained using the above method we can determine the spatial location of each free fiber counted (using the above method) or divide the width of the tissue into bins and determine the number of free fibers in each bin. A mathematical technique like Fourier analysis can then be used to compute the spatial distribution of the number of free fibers.

Average Effective FP height spatial distribution
From the image obtained using the above method we can divide the width of the tissue into bins and determine the average effective height for each bin. A mathematical technique like Fourier analysis can then be used to compute the spatial distribution of the average effective FP heights.

Distribution of average effective heights
From the image obtained using the above method we can divide the average effective height of fibers on a tissue into bins to obtain the distribution.

Free Fiber Area
The total number of pixels with intensity greater than or equal to the threshold within the regions described by Steps 8 in Section A, and 5 in Section C (steps that correlate to overall and base profiles of the substrate) would correspond to the FF Area.

Width of the FP
The width of a fiber may be determined by obtaining the derivative of the intensity of the pixels along the width of a sample a fixed distance from and parallel to the base profile. The distance between intensity transitions of the opposite sign would correlate with the width of the fiber.

Distribution of PP widths
From the image obtained using the above method we can estimate the width of each FF as described above and obtain the distribution of the different widths measured.

Identifying different color fibers in a multi-colored web substrate and determine associated metrics
The image data for a multi-colored web substrate can be collected using a similar setup and protocol but the image should be collected in color (ex. 24-bit). Using a suitable calibration with a standard color sampler thresholds can be determined that correspond to specific colors. The number of FP corresponding to each color can then be estimated using these thresholds for the web substrate with an analysis similar to that presented in this invention.

Additionally, the method of analysis used herein can be used for various household, cosmetic, and personal implements having the need for exemplary products such as:

Estimating the number of bristles on an object (toothbrush or mascara applicator)

For such an application an image for analysis may be obtained by inserting a contrasting background oriented generally parallel to the bristles and orienting the object generally orthogonal to the imaging device. As an alternative, to remove the effect of interacting bristles the object may also be micro-machined to a relevant thickness before being imaged against a contrasting background.

Estimating the loss in color intensity and/or number of fibers disposed upon fabrics (e.g., color retention type problems)

This would use our method in the same form the issue could be because of the fact that cotton has multiple smaller fibers that wrap together to form a single fiber (from yarn). This might need addition filtering or tweaking at the image analysis stage. To overcome the issues with thickness for certain fabrics the fabric may be machined into thin strips along the length or width, laid flat on a contrasting background and imaged.

Household cleaning implements (e.g., Swiffer pads)

To overcome the issues with thickness for certain fabrics the fabric may be machined into thin strips along the length or width, laid flat against a contrasting background and imaged.

Facial hair (e.g., razor development) or Eyelash measurement.

The image analysis approach for each of the above described applications would remain similar to that described in this invention. The main source of variation would be in the obtaining of the image and the preparation of the sample.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for counting the number of fibers emanating from the surface of a web substrate, the web substrate having a machine direction, MD, a cross-machine direction, CD, orthogonal and coplanar thereto, and a Z-direction orthogonal to both said machine and cross-machine directions, said method comprising the steps of:

a) providing an image file of said web substrate, said image file containing at least a two-dimensional image of said web substrate wherein at least one of said at least two-dimensions comprises at least a component of said Z-direction;

b) establishing a Z-direction baseline with respect to said image file having a length L and being generally co-planar to said Z-direction and having a component orthogonal to said Z-direction;

c) determining a pixel intensity of a first pixel disposed above said Z-direction baseline a height, d, and along said length L;

d) determining a pixel intensity of a second pixel disposed said height, d, disposed adjacent said first pixel, said second pixel being disposed said height, d, above said Z-direction baseline and generally orthogonal to said Z-direction;

e) determining a change of intensity between said first pixel and said second pixel;

f) determining a number of positive changes in said change of intensity from step e); and, g) correlating said number of positive changes from said step f) to said number of fibers emanating from said surface of said web substrate.

2. The method of claim 1 further comprising the step of providing an edge of said web substrate as said two-dimensional image.

3. The method of claim 2 wherein said step of providing an edge further comprises the step of folding said web substrate.

4. The method of claim 1 further comprising the step of providing said two-dimensional image as a grey-scale image.

5. The method of claim 4 further comprising the step of providing said grey-scale image as a scanned image of said web substrate disposed upon a contrasting background.

6. The method of claim 5 further comprising the step of providing said scanned image with a resolution of at least about 50 dpi.

7. The method of claim 6 further comprising the step of providing said scanned image with a resolution of at least about 1200 dpi.

8. The method of claim 4 further comprising the step of providing said two-dimensional image as a digital file.

9. The method of claim 1 wherein said step of establishing said Z-direction baseline further comprises the step of converting said image file to a binary file.

10. The method of claim 9 further comprising the step of determining an edge from said binary file.

11. The method of claim 1 wherein said step of establishing said Z-direction baseline further comprises the step of establishing said baseline generally parallel to a direction orthogonal and co-planar to said Z-direction.

12. The method of claim 1 further comprising the step of providing said image file with an orientation.

13. The method of claim 12 wherein said step of providing said image file with an orientation further comprises the step of providing said web substrate with an edge generally parallel to either said MD or said CD.

14. The method of claim 13 wherein said step of providing said web substrate with an edge generally parallel to said MD or CD is provided prior to said step c).

15. The method of claim 1 further comprising the step of determining a threshold value.

16. The method of claim 15 further comprising the step of determining an average pixel intensity of a region disposed below said Z-direction baseline.

17. The method of claim 16 further comprising the step of comparing said threshold value to said change of intensity between said first and second pixels.

18. The method of claim 1 further comprising the step of prior to step g), determining a threshold value from the determination of the number of positive changes in intensity.

19. The method of claim 1 further comprising the steps of determining a pixel intensity of a third pixel disposed a height, 2d, above said Z-direction baseline and along said length L, determining a pixel intensity of a fourth pixel disposed adjacent said third pixel, said fourth pixel being disposed said height, 2d, above said Z-direction baseline and generally orthogonal to said Z-direction, determining a change of intensity between said third pixel and said fourth pixel, determining a number of positive changes in said change of intensity between said third pixel and said fourth pixel, mathematically averaging said number of positive changes in said change of intensity between said first pixel and said second pixel with said number of positive changes in said change of intensity between said third pixel and said fourth pixel, and, correlating said mathematically averaged number of positive changes in said change of intensity between said first pixel and said second pixel with said number of positive changes in said change of intensity between said third pixel and said fourth pixel to said number of fibers emanating from said surface of said web substrate.

* * * * *